(12) United States Patent
Han

(10) Patent No.: US 7,545,317 B2
(45) Date of Patent: Jun. 9, 2009

(54) METHOD AND APPARATUS FOR NAVIGATION DATA DOWNLOADS FROM WEAK SIGNALS

(75) Inventor: Shaowei Han, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 11/558,611

(22) Filed: Nov. 10, 2006

(65) Prior Publication Data

US 2008/0111736 A1    May 15, 2008

(51) Int. Cl.
*G01S 1/00* (2006.01)
*H03K 9/00* (2006.01)

(52) U.S. Cl. .................. 342/357.02; 342/357.06; 342/357.12; 375/316

(58) Field of Classification Search .................. 342/357.01–357.17
See application file for complete search history.

(56) References Cited

U.S. PATENT DOCUMENTS

| | | | |
|---|---|---|---|
| 5,323,322 A * | 6/1994 | Mueller et al. .............. 701/215 |
| 5,587,716 A | 12/1996 | Sheyublat | |
| 5,731,787 A | 3/1998 | Sheyublat | |
| 5,768,319 A * | 6/1998 | Durboraw, III .............. 375/316 |
| 5,870,426 A * | 2/1999 | Yokev et al. ................. 375/133 |
| 6,150,978 A * | 11/2000 | McBurney ............. 342/357.04 |
| 6,515,620 B1 | 2/2003 | Jandrell | |
| 7,057,553 B2 | 6/2006 | Jandrell | |
| 2001/0004761 A1* | 6/2001 | Zehavi ........................ 714/784 |
| 2003/0016167 A1* | 1/2003 | Dooley et al. .......... 342/357.06 |
| 2003/0226096 A1* | 12/2003 | Shen et al. .................. 714/796 |
| 2005/0099334 A1* | 5/2005 | Roh ....................... 342/357.12 |
| 2007/0152878 A1* | 7/2007 | Wang et al. ............ 342/357.06 |
| 2007/0177729 A1* | 8/2007 | Reznik et al. .................. 380/44 |

* cited by examiner

*Primary Examiner*—Thomas H Tarcza
*Assistant Examiner*—Harry Liu
(74) *Attorney, Agent, or Firm*—Haynes & Boone, LLP.

(57) ABSTRACT

The present invention provides systems and methods that enable a standalone receiver capable of downloading navigation data under weak signal conditions. In an embodiment, a standalone navigation receiver generates predicted satellite orbits based on the tracking history of the satellites stored in the receiver. The tracking history comprises historical navigation data previously received from the satellites. The receiver uses the predicted satellite orbit to generate navigation data such as ephemeris and almanac. Since the predicted satellite is accurate, the generated navigation data is similar to the navigation data transmitted by the navigation satellites, and can therefore be used by the receiver to correct the downloaded navigation data bits. Thus many of the bits of a downloaded navigation word, especially the higher order significant bits of the word can be corrected. The remaining bit errors can be resolved based on a parity check of the word.

17 Claims, 3 Drawing Sheets

WORD CORRECTION PROCESS

FIG. 1 A GPS baseband hardware

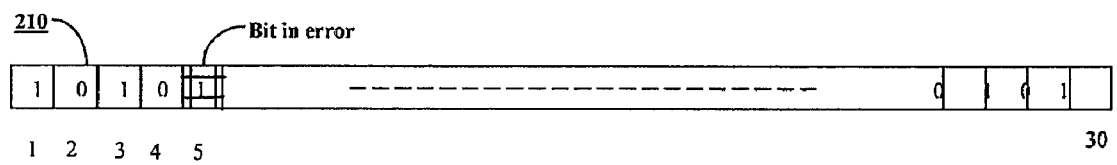
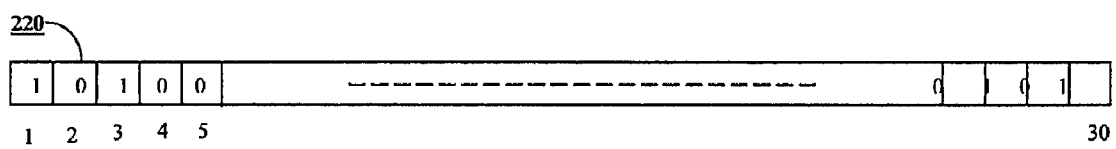
FIG. 2

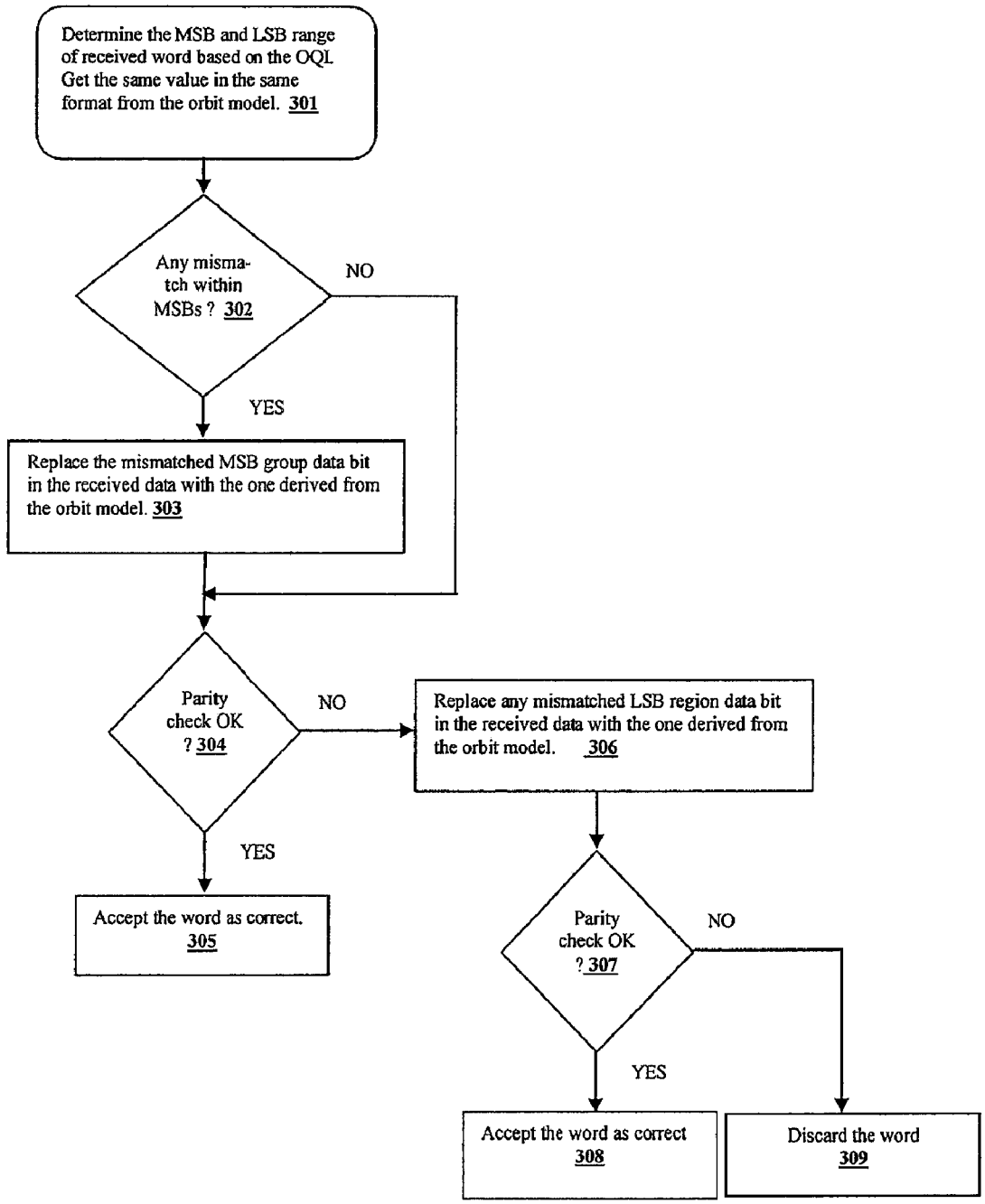
FIG. 3 WORD CORRECTION PROCESS

US 7,545,317 B2

METHOD AND APPARATUS FOR NAVIGATION DATA DOWNLOADS FROM WEAK SIGNALS

FIELD OF THE INVENTION

The present invention relates generally to navigational receivers, and more particularly to systems and methods that enable navigational receivers to download navigation data from weak satellite signals.

BACKGROUND OF THE INVENTION

With the development of radio and space technologies, several satellite-based navigation systems have already been built and more will be in use in the near future. One example of such satellite-based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0' s. These two '0' s help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The super frame contains twenty five consecutive frames. While the contents of the sub-frames 1, 2 and 3 repeat in every frame of a superframe except the TOW and occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4.

The almanac and ephemeris are used in the computation of the position of the satellites at a given time. The almanacs are valid for a longer period of six days but provide a less accurate satellite position and Doppler compared to ephemeris. Therefore almanacs are not used when fast position fix is required. On the other hand, the accuracy of the computed receiver position depends upon the accuracy of the satellite positions which in-turn depends upon the age of the ephemeris. The use of current ephemeris results in better position estimation than one based on non-current or obsolete ephemeris. Therefore it is necessary to use current ephemeris to get a fast receiver position fix.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TTFF due to the less accurate Doppler estimation. The 'cold start' takes still more time for the first position fix as there is no data available to aid signal acquisition and position fix.

After the signal from a satellite has been acquired, the receiver goes to track mode during which it tracks the signal and also downloads the 50 bits/second navigation data. When the signal is strong, the data can be downloaded without error and within the shortest time possible. However, when the received satellite signal is weak due to operation indoors or due to buildings or foliage obstructing the signal, the receiver takes more time to acquire the signal and later during the tracking process it may not be able to correctly down load the associated navigation data. In some cases the correct ephemeris data may be obtained after download of several consecutive frames. This obviously results in a very long wait time. To resolve this problem, the present day receivers receive assistance data containing the current ephemeris through a server or telephone base station. However, this requires additional infrastructure and an arrangement with telephone service providers thus making this process expensive and dependent on many outside factors. There are some patented techniques of downloading the navigation data in a standalone mode. U.S. Pat. No. 5,768,319 assigned to Motorola discloses a method based on overlaying several of the consecutive frames and deciding the value of each bit by computing the average power of the similarly placed bits. Thus this procedure requires downloading a large number of consecutive frames over a long period of time which is unacceptable to the user. U.S. Pat. Nos. 5,731,787 and 5,587,716 disclose a navigation data prediction method that is used when there is no DGPS message reception. A method by Qualcomm is disclosed in the U.S. Pat Pub. No. 2002/0049536, which involves predicting a part of the navigation data (HOW word) by incrementing the Z count of the already received old data. The parity check bits are also changed accordingly. Thus this method is limited to part of the navigation data prediction and under some cases it may obtain assistance data from a server. U.S. Pat. No. 6,515,620 and U.S. Pat. Pub. No. 2005/0035904, which deal with standalone receivers, disclose a technique where only part of the navigation data are predicted.

Therefore, there is a need for a standalone receiver capable of downloading the entire or most of the navigation data under weak signal conditions at a faster rate.

SUMMARY

Accordingly, the present invention provides systems and methods that enable a standalone receiver capable of downloading navigation data under weak signal conditions.

In an embodiment, a standalone navigation receiver generates predicted satellite orbits based on the tracking history of the satellites stored in the receiver. The tracking history comprises historical navigation data previously received from the satellites. The receiver uses the predicted satellite orbit to generate navigation data such as ephemeris and almanac. Since the predicted satellite orbit is accurate, the generated navigation data is similar to the navigation data transmitted by the navigation satellites, and can therefore be used by the receiver to correct the downloaded navigation data bits. Thus many of the bits of a downloaded navigation word, especially the higher order significant bits of the word can be corrected. The remaining bit errors can be resolved based on a parity check of the word. The predicted data bits can be used in data assisted signal acquisition, tracking and reacquisition under weak signal conditions.

The above and other advantages of embodiments of this invention will be apparent from the following more detailed description when taken in conjunction with the accompanying drawings.

BRIEF DESCRIPTION OF THE DRAWINGS

FIG. 2 shows an exemplary downloaded navigation word and a corresponding word derived from an orbit model.

FIG. 3 illustrates a process for correcting a navigation data word according to an embodiment of the invention.

DETAILED DESCRIPTION

Figure 1:
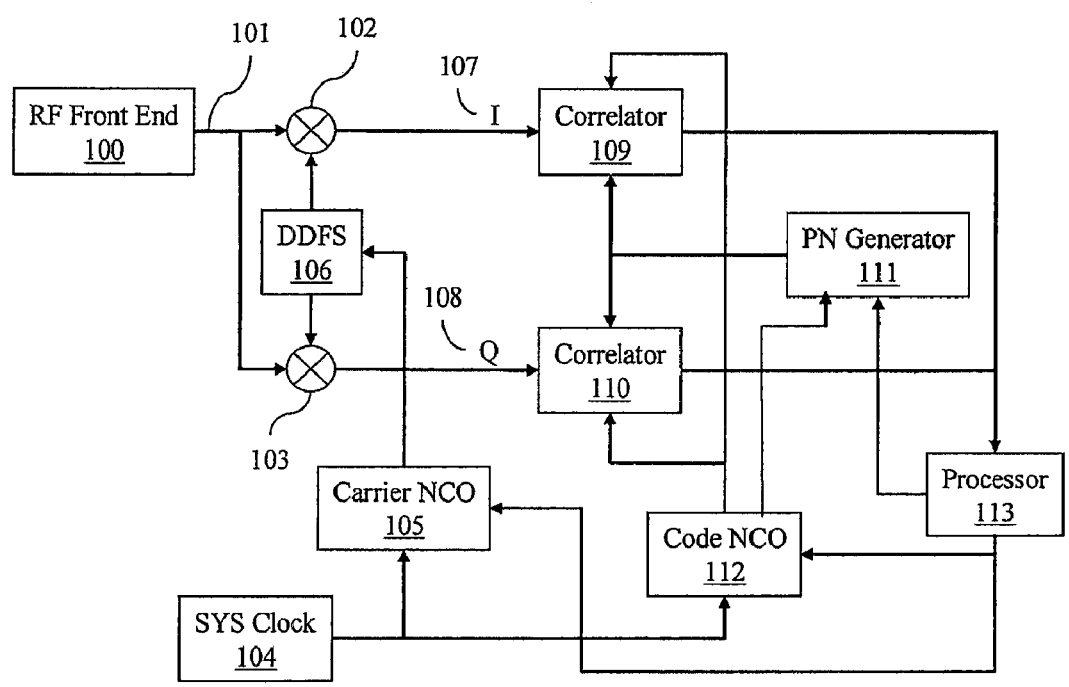
FIG. 1 is a block diagram illustrating a GPS receiver according to an embodiment of the present invention.

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times. The various functions of the invention discussed below may be implemented in software executed by a processor in the receiver.

A GPS receiver uses the down-loaded ephemeris to accurately compute the position of the visible satellites. Based on these satellite positions, the position of the receiver is estimated. This computed position is more accurate if the ephemeris used is current. In the case of GPS these ephemeris are updated every two hours even though they are valid for a period of four hours. If ephemeris is used beyond this period of four hours, it causes an offset in pseudorange where the pseudorange is the estimated distance of the satellite from the receiver with no corrections applied for the receiver clock drift, atmospheric delay, etc. This pseudorange offset is constant during a short period of time, e.g., two to three minutes, and therefore causes the computed position to shift from the true position. In addition to the shift in the position, the estimated values of Doppler and Doppler rate are also not accurate with non-current ephemeris and result in a longer search time with a longer Time-To-First-Fix (TTFF). Thus, it is necessary to download and use current ephemeris to minimize this position error and the TTFF. However, it is not always possible to have current ephemeris in the memory of the GPS receiver. In some cases, the satellite signals may be obstructed by a building or foliage or the receiver may be operating indoors. As a result, the downloaded navigation data may have some bits in error. These bit errors may be corrected by downloading the navigation data multiple times and selecting the bit appearing in the majority of the frames as the correct one. However, this method requires a long time to download several consecutive sets of frames. Another method is to get these navigation data through assisting networks which requires a complex network and protocols, which are not useable with standalone receives. The present invention overcomes these problems.

The present invention enables a navigation receiver to derive navigation data using accurate navigational satellite orbit predictions based on historical broadcast ephemeris and measurements. Systems and methods for predicting satellite orbits at the receiver based on historical navigation data stored in the receiver are disclosed in co-pending U.S. patent application Ser. No 11/558,614, titled "A Method and Apparatus in Standalone Positioning Without Broadcast Ephemeris," filed on the same date as the present application, the specification of which is incorporated in its entirety by reference. The satellite orbit can be predicted based on historical broadcast ephemeris using a Kalman filtering algorithm or a least squares estimator. The least squares estimator may employ Chebyshev or Lagrangian polynomial interpolation or any other fitting/prediction function that fits a model of the satellite orbit to historical and predicted data. Once the satellite orbit has been accurately predicted, navigation data, e.g., ephemeris values, can be derived from the predicted orbit. This derived navigation data can be formatted in the same format as navigation data downloaded from a satellite. For example, the predicted orbit can itself be in the navigation data format with orbits determined in terms of Eccentricity $e_s$, square root of semi-major axis, correction terms, etc. Thus, the derived navigation data can be used to correct bits in the downloaded navigation data, as explained further below.

A Kalman filtering method may be used to determine the clock drift and other clock parameters, in which a Kalman filter uses historical satellite clock data to determine the clock drift. This clock drift may be later used to refine the clock parameter values such as clock drift. Thus the clock value modified with the clock drift as computed above gives the predicted clock.

Co-pending U.S. patent application Ser. No. 11/558,614, titled "A Method and Apparatus in Standalone Positioning Without Broadcast Ephemeris," previously incorporated by reference, discloses a method of determining the clock drift by fitting a second order polynomial function to a set of historical satellite clock offsets using least squares estimation.

The various elements of the ephemeris and the number of bits and scale factor are given in Table 1 for subframe 1 and in Table 2 for subframe 3. The subframe 1 mainly contains the clock correction coefficients and contains no Keplerian elements and is not shown here.

TABLE 1

Ephemeris Parameters in Subframe 2

| Parameter | Location | Number of Bits | Scale Factor (LSB) | Effective Range | Units |
|---|---|---|---|---|---|
| IODE | 61-68 | 8 | | | |
| $C_{rs}$: Amplitude of the sine harmonic correction terms to the orbit radius | 69-84 | 16 | $2^{-5}$ | | Meters |
| $\Delta n$: Mean motion difference from computed value | 91-106 | 16* | $2^{-43}$ | | semi-circles/sec |
| $M_0$: Mean anomaly at reference time | 107-114; 121-144 | 32* | $2^{-31}$ | | Semi-circle |
| $C_{uc}$: Amplitude of the cosine harmonic correction term to the argument of latitude | 151-166 | 16* | $2^{-29}$ | | Radians |
| $e_s$: Eccentricity | 167-174; 181-204 | 32 | $2^{-33}$ | 0.03 | Dimensionless |
| $C_{us}$: Amplitude of the sine harmonic correction term to the argument of latitude | 211-226 | 16* | $2^{-29}$ | | Radians |
| $\sqrt{a_s}$: Square root of the semimajor axis | 227-234; 241-264 | 32 | $2^{-19}$ | | meters $^{1/2}$ |
| $t_{oe}$: Reference time ephemeris | 277-286 289-294 | 16 | $2^4$ | 604, 784 | seconds |

TABLE 2

Ephemeris Parameters in Subframe 3

| Parameter | Location | Number of Bits | Scale Factor (LSB) | Effective Range | Units |
|---|---|---|---|---|---|
| $C_{ic}$: Amplitude of the cosine harmonic correction term to angle of inclination | 61-76 | 16* | $2^{-29}$ | | radians |
| $\Omega_e$: Longitude of ascending node of orbit plane at weekly epoch | 77-84; 91-114 | 32* | $2^{-31}$ | | semi-circles |
| $C_{is}$: Amplitude of the sine harmonic correction term to the angle of inclination | 121-136 | 16* | $2^{-29}$ | | radians |
| $i_0$: Inclination angle at reference time | 137-144; 151-174 | 32* | $2^{-31}$ | | semi-circles |
| $C_{rc}$: Amplitude of the sine harmonic correction term to the orbit radius | 181-196 | 16* | $2^{-5}$ | | meters |
| $\omega$: Argument of perigee | 197-204; 211-234 | 32* | $2^{-31}$ | | semi-circles |
| $\dot{\Omega}$: Rate of right ascension | 241-264 | 24* | $2^{-43}$ | | radians |
| IODE | 271-278 | 14* | $2^{-43}$ | | semi- |

TABLE 2-continued

Ephemeris Parameters in Subframe 3

| Parameter | Location | Number of Bits | Scale Factor (LSB) | Effective Range | Units |
|---|---|---|---|---|---|
| idot: Rate of inclination angle | 279-292 | | | | circles/sec |

*Parameters so indicated are two's complement.

FIG. 2 shows an example of a hypothetical word representing some ephemeris parameter. Reference 210 refers to the bits of a navigation word extracted from a weak satellite signal. As such, many of the bits of this word are in error. Reference 220 refer to bits of the same ephemeris parameter obtained by the predicted satellite orbit. Word 210 should be identical to word 220 when the word extracted from the satellite signal contains no errors and the predicted satellite orbit is very accurate. However, usually the ideal condition does not exist and there may be some changes especially in the Low Significant Bits (LSBs), which are bits corresponding to lower value or lower ordered bits. On the other hand, the higher or Most Significant Bits (MSBs) of the words 210 and 220 should be identical. In this example, the $5^{th}$ bit of word 210 is in error as it is different from the $5^{th}$ bit of word 220, assuming an accurate predicted orbit. In this case, this bit in word 210 should be changed to 0. However, if there is a difference in one of the LSBs, e.g., the $23^{rd}$ bit, this may be due to the accuracy of the actual value from the satellite and the computed value. Thus, this may not be an error. To confirm that this is not an error, the parity bit in the word may be used. If the parity check of the word indicates an error, then this bit is changed and the parity check is performed again. If the parity check still indicates an error, then a more elaborate method may be used.

Normally, the predicted orbit is associated with an orbit quality indicator (OQI). A high OQI indicates that the predicted orbit is very accurate. Therefore, for high OQI, the ephemeris and other navigation data derived from the predicted orbit are almost the same as the one transmitted by a satellite. Therefore, the ephemeris derived from the predicted orbit and the one transmitted by the satellite may differ only in some LSBs of a navigation word. The navigation word may be divided into two groups: MSB group and the LSB group. Bits with higher confidence levels are placed in the MSB. These are the bits in which there is a high degree of confidence that the bits of the derived navigation word are accurate. For a high value of OQI most of the bits in the word are considered to be in the MSB, and as the value of OQI decreases, the number of bits in the MSB group decreases. Thus, it may be assumed that that bits in the MSB group of a navigation word transmitted by a satellite match the bits in the MSB group of the derived navigation word. The same cannot be said for the LSB group. It should be noted that for GPS only 24 bits of a navigation word form the MSB and LSB group with the remaining 6 bits being parity bits.

For example, the OQI obtained in the orbit estimation process may have a highest value of 1 in which all 24 bits have a full confidence value of 1 and the MSB group consists of all 24 bits. In this case the downloaded bits are compared with the predicted data bits and any error in the downloaded bits is corrected by simply substituting the predicted bits. If, on the other hand, the OQI is say equal to 0.8, then 20 bits of the predicted values out of 24 bits may have a confidence value of 1 and belong to the MSB group while the remaining 4 bits belong to the LSB group. Thus the first 20 bits of the downloaded word are corrected using the predicted bits of the word. The remaining 4 bits of the predicted word have a confidence value of 0 and so the last 4 bits of the downloaded bits may be corrected through a parity check. The division of the predicted word as MSB group and LSB group may be done based on a trial and error training process.

In another embodiment, each of the predicted bits of a word may be given separate confidence values with the most significant bits having the highest value. This value decreases for the lower significant bits and is the least for the $24^{th}$ bit. This variation may be linear or non-linear which may be determined based on a trial and error training process. The confidence values may be the same for all of the downloaded bits since all bits may be affected uniformly. Let $S_i$ be the $i^{th}$ bit of the predicted word and $D_i$ be the $i^{th}$ bit of the downloaded word. Further, let $WS_i$ be the confidence value of the bit $S_i$ while $WP_i$ be the confidence value of the bit $D_i$. The resulting confidence value for the $i^{th}$ position bit $W_{Ei}$ is given by:

$W_{Ei}=(WS_i+WP_i)/2$ when both bits are the same.

$W_{Ei}=(WS_i-WP_i)/2$ when the bits are different.

Based on the value of $W_{Ei}$ the bit value may be determined. If the value of $W_{Ei}$ is positive, the predicted value is used and if it is negative the downloaded value is used. Thus when the downloaded and predicted values are the same that value is used and when they are different the one with the higher confidence value is used.

FIG. 3 illustrates a bit correction procedure for a given downloaded navigation or ephemeris data word according to an embodiment of the invention. Based on the value of the OQI, the 24 data bits of the navigation word to be corrected are grouped into the MSB group and the LSB group, as shown in block 301. Also in block 301, the same data word is constructed using the predicted orbit. The MSB bits of the downloaded word and derived word are compared bit by bit to look for possible mismatches, as shown in block 302. In block 303, the mismatched MSB bits in the downloaded word are changed from '0' to '1' or '0' to '1' as the case may be. If there is no mismatch of the MSB bits, then no change is necessary as indicated by the 'NO' branch from block 302 In block 304, a parity check is performed on the downloaded word using the parity bits. If the parity check indicates no error, then the downloaded word is accepted, as indicated by block 305. On the other hand, if parity check indicates an error, then any mismatched LSB bits in the downloaded word are changed one by one starting from the highest value bit in the LSB group towards the lowest value bit until there is no parity error, as shown in block 306. For each bit change, a parity check is performed in block 307. If the parity check indicates no error, then the word is accepted as correct in block 308. If the parity check still indicates an error, then the word is discarded.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A method of correcting navigation data at a navigation receiver, comprising:
generating navigation data bits at the receiver from navigation information, wherein the navigation information comprises information from a local navigation database, a predicted satellite orbit based on historical data stored in the receiver, predicted satellite clock parameters based on historical satellite clock data stored in the receiver, or a combination thereof;
downloading navigation data from a satellite;
correcting data bits of the downloaded navigation data using the generated navigation data bits; and
further correcting data bits of the downloaded navigation data using a bit error correction methodology with parity bits.

2. The method of claim 1, further comprising converting the generated navigation data into a same format as the downloaded navigation data.

3. The method of claim 2, wherein the generated navigation data is encoded in a GPS format.

4. The method of claim 2, wherein the generated navigation data is encoded in a navigation data format other than GPS.

5. The method of claim 1, further comprising:
associating the generated navigation data with a confidence level for each bit; and associating the downloaded navigation data bits with a confidence level for each bit, wherein the downloaded navigation data bits are corrected based on the confidence levels.

6. The method of claim 1, wherein the information in the local database includes historical navigation data, receiver clock frequency, predicted Doppler frequency offsets and drifts, predicted receiver position, predicted satellite positions, and predicted satellite clock.

7. The method of claim 5, wherein associating the generated navigation bits with a confidence level includes organizing the generated navigation bits into most significant bits and less significant bits, and wherein associating the downloaded navigation bits with a confidence level includes organizing the downloaded navigation bits into most significant bits and less significant bits, and wherein the most significant bits have a high confidence while the less significant bits have less confidence.

8. The method of claim 7, wherein the generated navigation data bits are from a predicted orbit or clock.

9. The method of claim 7, wherein correcting the downloaded navigation bits comprises correcting only the most significant downloaded navigation bits based on the most significant generated navigation bits.

10. A navigation signal receiver, comprising:
a radio frequency front-end for receiving satellite signals;
a baseband section for processing received signals into correlation values; and a processor coupled to the baseband section, wherein the processor generates navigation bits from navigation information, wherein the navigation information comprises information from a local navigation database, a predicted satellite orbit based on historical data stored in the receiver, predicted satellite clock parameters based on historical satellite clock data stored in the receiver, or a combination thereof, downloads navigation data from a satellite, corrects data bits of the downloaded navigation data using the generated navigation data bits, and further corrects data bits of the downloaded navigation data using a bit error correction methodology with parity bits.

11. The receiver of claim 10, wherein the processor converts the generated navigation data into a same format as the downloaded navigation data.

12. The receiver of claim 11, wherein the generated navigation data is encoded in a GPS format.

13. The receiver of claim 11, wherein the generated navigation data is encoded in a navigation data format other than GPS.

14. The receiver of claim 10, wherein the processor associates the generated navigation data bits with a confidence level for each bit and associates the downloaded navigation data bits with a confidence level for each bit, wherein the processor corrects the downloaded navigation data bits based on the confidence levels.

15. The receiver of claim 10, wherein the information in the local database includes historical navigation data, receiver clock frequency, predicted Doppler frequency offsets and drifts, predicted receiver position, predicted satellite positions, and predicted satellite clock.

16. The receiver of claim 14, wherein the generated navigation data bits are from a predicted orbit or clock.

17. The receiver of claim 16, wherein the confidence level of the generated navigation data bits are determined based on the accuracy of the predicted satellite orbit or predicted satellite clock.

* * * * *